United States Patent [19]
Hock

[11] Patent Number: 5,275,858
[45] Date of Patent: Jan. 4, 1994

[54] WOVEN CONVEYOR BELT SPLICE FABRIC AND CONVEYOR BELT SPLICE FORMED THEREWITH

[75] Inventor: Michael J. Hock, Charlotte, N.C.

[73] Assignee: Scandura, Inc., Charlotte, N.C.

[21] Appl. No.: 946,024

[22] Filed: Sep. 14, 1992

Related U.S. Application Data

[63] Continuation of Ser. No. 597,820, Oct. 15, 1990, abandoned.

[51] Int. Cl.$^5$ .............................. B29H 9/02; B32B 3/00
[52] U.S. Cl. ............................................ 428/58; 428/59; 428/230; 428/231; 428/25; 428/252; 428/369; 428/212; 198/844.2
[58] Field of Search .................. 428/224, 225, 58, 59, 428/212, 230, 231, 369; 198/844.6

[56] References Cited

U.S. PATENT DOCUMENTS 3,546,054  12/1970  Ross ..................................... 161/38
3,693,218   9/1972  Jaubert et al. ........................ 24/38
4,094,402   6/1978  Heeke ................................. 428/212

OTHER PUBLICATIONS

"Key Points-Diagonal Butt Splice-Usflex/Mineflex I Belts" Product Information Brochure by Scandura, Inc.
"Key Points-Diagonal Lapped Splice-Royalon Reduced Ply and Multiple-Ply Belts" Product Information Brochure by Scandura, Inc.
"Kevlar in Conveyor Belts" Seminar Book.

Primary Examiner—Patrick J. Ryan
Assistant Examiner—Richard C. Weisberger
Attorney, Agent, or Firm—Shefte, Pinckney & Sawyer

[57] ABSTRACT

A woven conveyor belt splicing fabric of optimal strength, elongational and dimensional properties is produced by intermeshing relatively high tenacity and relatively high elastic modulus warp yarns (e.g., KEVLAR yarns) in a highly crimped one-by-one weave construction with nylon or other suitable filling yarns. The tenacity of the warp yarns provides high strength per unit fabric thickness while the crimp of the warp yarns provides a limited degree of initial stretchability of the fabric from a relaxed state sufficient to accommodate strain and deflective forces imposed on a conveyor belt splice during normal belt operation.

9 Claims, 4 Drawing Sheets

WOVEN CONVEYOR BELT SPLICE FABRIC AND CONVEYOR BELT SPLICE FORMED THEREWITH

This is a continuation of copending application Ser. No. 597,820, filed Oct. 15, 1990, now abandoned.

BACKGROUND OF THE INVENTION

The present invention relates generally to the formation of endless conveyor belts and, more particularly, to the formation of butt-type splices between two conveyor belt ends.

Rubber or PVC based conveyor belts have many and varied industrial applications. Typically, such conveyor belts are of a substantially flat open-width laminated construction comprised of an intermediate carcass layer having a carry cover bonded coextensively to one face thereof and a pulley cover bonded coextensively to the opposite face thereof to form a composite trilaminate belting material. The pulley cover forms the inward surface of the belting, i.e., the surface which will contact pulleys and other guiding and support structure in the operational end usage of the belting, while the carry cover forms the outward surface of the belting which will be exposed for transport of materials thereon or other end use functions of the belting.

In many, if not most, uses of such conveyor belts, an elongate length or lengths of the belting are connected end-to-end with one another to produce a continuous conveyor belt. The connection of belt ends to one another can be accomplished in various manners, one commonly preferred means of connection being to adhesively splice belt ends together in an end-abutting relationship whereby the splice area is substantially comparable in cross-sectional dimension and operability to the remaining lengthwise extent of the overall belt. Typically, such a so-called butt splice is produced by initially cutting the belt ends to be connected along parallel diagonal lines for precise end edge abutment and then cutting away the carry and pulley covers from each belt end to form diagonal recesses on each opposite side of the belt ends when abutted. Preferably, the carry cover side of each belt end is cut away to a greater extent than the pulley side so that when the prepared belt ends are abutted the recess formed at the carry belt cover side is larger lengthwise with respect to the belts than the recess formed on the pulley cover side. The thusly prepared belt ends are then adhesively joined in end-abutting relation by cementing or otherwise adhering a piece of splicing material and a covering insert member into the recesses at each opposite side of the abutted belt ends so as to overlap the exposed intermediate carcass layer of each belt end, commonly referred to as a "scab." The splicing material and the covering insert member are cut to correspond substantially in shape to the respective recesses. The covering insert member commonly is of substantially the same material as the carry and pulley covers of the belting. The splicing material utilized in the recess at the pulley cover side of the abutted belt ends is typically an adhesive-backed so-called breaker strip, while the splicing material typically utilized in the recess at the carry cover side of the belt ends is typically a textile fabric.

Since the carry cover side of the conveyor belt faces outwardly in its normal operation and thereby is subjected to greater stress and strain, e.g., when traveling through a change of direction about a supporting pulley, it is important that the portion of a splice at the carry cover side of abutted belt ends have appropriate strength, flexibility and elongational properties to withstand normal operation of the belt. A primary factor determining these properties of a belt splice is the splice fabric utilized in the recess on the carry cover side of a belt splice. Ideally, the splice fabric should have relatively high tensile strength yet be relatively flexible and be stretchable only to a limited extent sufficient to accommodate elongational forces to which the conveyor belt is typically subjected. At the same time, the fabric thickness should be minimized so that the overall thickness of the belt is not increased at splice locations.

No known fabric meets all of these properties. Instead, conventional splice fabrics represent a compromise of the optimal combination of properties. One of the most common conventional splice fabrics currently in use is a woven fabric formed of a set of relatively high denier nylon warp yarns held in a substantially linear orientation by filling yarns at each opposite side of the nylon warp yarns intermeshed with a second set of relatively low denier binder warp yarns. While nylon is of a relatively lower tenacity and relatively lower modulus of elasticity than other known textile yarns, this woven structure, particularly, the linear orientation of the nylon warp yarns, minimizes the stretchability of the fabric and it generally maximizes the fabric tenacity per unit fabric thickness possible with use of nylon yarns while maintaining a sufficient degree of warpwise flexibility in the fabric for use in conveyor belt splices. Disadvantageously, however, such fabrics are nevertheless relatively thick due to the high denier of the nylon warp necessary to achieve an acceptable minimal level of fabric strength, in comparison to the fabric thickness which would be produced by the same fabric construction if a lower denier yarn of higher tenacity were to be used, e.g., polyester yarn. Unfortunately, attempts to use such polyester yarn fabrics in conveyor belt splices to overcome the deficiencies of conventional nylon splicing fabrics have not been successful because the fabric construction coupled with the high tenacity and high modulus of elasticity of polyester yarns gives the fabric such a high modulus of elasticity that the fabric exhibits a tendency to separate from the spliced belt ends under operational stresses. Accordingly, conventional wisdom has developed that conventional yarns of a high modulus of elasticity, which typically also exhibit a high tenacity, are unsuitable for use in conventional splicing fabric construction.

SUMMARY OF THE INVENTION

It is accordingly an object of the present invention to provide a novel conveyor belt splicing fabric and a novel conveyor belt splice formed therewith which overcomes the deficiencies of the prior art and optimizes the properties desired in a conveyor belt splicing fabric.

Briefly summarized, the splicing fabric of the present invention is a woven fabric comprised of a set of warp yarns of relatively high tenacity and relatively high modulus of elasticity intermeshed with filling yarn in a weave construction wherein the warp yarns are sufficiently crimped to render the fabric relatively bendable in its warpwise direction and to provide the fabric with a relatively lower modulus of elasticity in response to warpwise elongational forces in an initial range of fabric elongation from a relaxed state in comparison to the modulus of elasticity of the warp yarns themselves. As such, the present woven fabric is characterized by a sufficiently high warpwise strength and flexibility in relation to fabric thickness and a limited degree of warpwise stretchability to be suitable for use in a scab-type butt splice between two conveyor belt ends.

It is contemplated that various yarns may be suitable for use as warp yarns in the present fabric, including for example, aramid, glass, carbon, graphite, steel, polybenzimidozole, and boron yarns. Aramid yarns consisting essentially of multiple continuous aramid filaments having para-oriented polyamide molecules are preferred. For most contemplated embodiments, the warp yarns are of a denier exceeding 1,000. The filling yarns are preferably multi-filament nylon yarns also of a denier exceeding 1,000.

It is further preferred that the crimp of the warp yarns be at least approximately 10% and that the filling yarns be relatively uncrimped, preferably less than approximately 5.0%. For this purpose and to maximize the warpwise strength of the fabric, the number of warp yarns per unit of weftwise dimension of the fabric is generally maximized for the denier of the warp yarns while the number of filling yarns per unit of warpwise dimension of the fabric is selected to generally maximize the crimp of the warp yarns. It is contemplated that the optimal fabric construction to achieve these properties is a one-by-one weave of the warp and filling yarns. As necessary or desirable, the fabric may be subjected to a finishing operation to apply an adhesive finish to the fabric to promote bonding when used in a conveyor belt splice.

The fabric of the present invention is preferably incorporated in a conveyor belt butt splice comprising two belt ends abutted end-to-end with one another, with the belt ends having respective splicing recesses adjoining and opening to one another across the abutment of the belt ends and with the present splicing fabric adhesively bonded to the belt ends in the adjoining recesses across the abutment of the belt ends with the warpwise extent of the fabric in substantial alignment with the longitudinal extent of the abutting belt ends. In most such splices, the splicing recesses are formed in an outward side of each belt end facing away from the belt support means during belt operation.

DESCRIPTION OF THE PREFERRED EMBODIMENT

Figure 1:
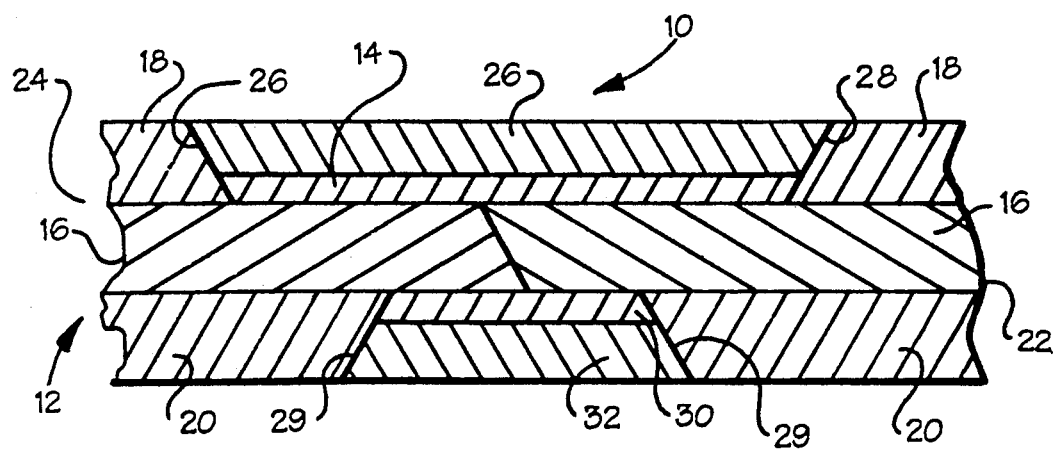
FIG. 1 is a cross-sectional view of a diagonal butt splice between abutting conveyor belt ends, taken lengthwise of the conveyor belt, wherein the splicing fabric of the present invention is incorporated.

Referring now to the accompanying drawings and initially to FIG. 1, there is indicated generally at 10 a diagonal butt splice in a conveyor belt 12 of the type wherein the splicing fabric of the present invention, indicated at 14, is preferably utilized. The belt 12 is of the conventional type having an elongate extent of substantially uniform width and composed of a central full-width lengthwise-extending carcass layer 16, typically formed of synthetic or natural rubber imbedded with a reinforcing fabric or yarns, laminated between full-width lengthwise-extending rubber carry cover and pulley cover layers 18,20, respectively. The splice 10 connects two ends 22,24 of the belt 12 in end-abutting relation. Specifically, as above-described, each belt end is cut transversely along mating parallel diagonal lines and the carry and pulley covers 18,20 are cut away to a predetermined dimension from each belt end 22,24 to expose the carcass layer 16. The belt ends 22,24 are adhesively joined to one another with their exposed carcass layers 16 in coextensive end abutment by cementing a piece of the splicing fabric 14 and a rubber cover insert member 26 in overlapping relation to the abutted carcass layer ends within the recess 28 formed by the cut-away portions of the carry cover layers 18 and by similarly cementing a braker strip 30 and a rubber cover insert member 32 in similar fashion within the recess 29 at the opposite side of the abutted belt ends 22,24 formed by the cut away portions of the pulley cover layers 20. Except for the use of the fabric 14 of the present invention, the construction of the splice 10 is substantially conventional.

Figure 2:
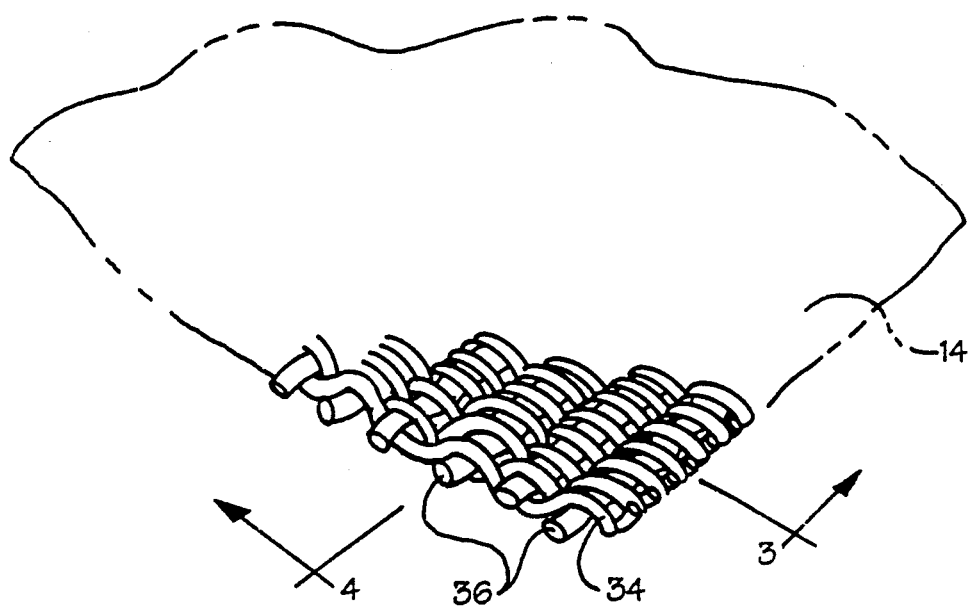
FIG. 2 is a perspective view of a small piece of the splicing fabric of the present invention, shown as greatly enlarged for purposes of illustration.
Figure 3:
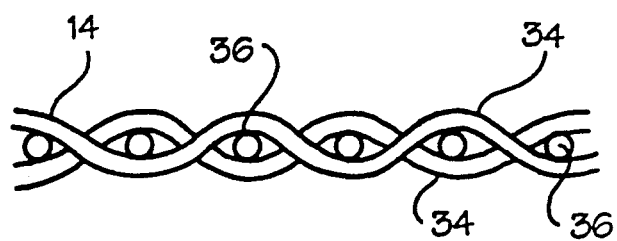
FIG. 3 is a warpwise cross-sectional view taken through the fabric of FIG. 2 along line 3—3 thereof.
Figure 4:
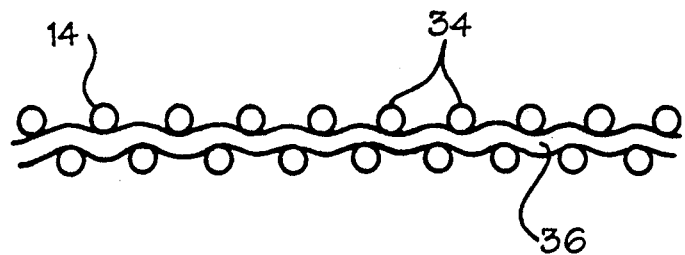
FIG. 4 is a weftwise cross-sectional view taken through the fabric of FIG. 2 along line 4—4 thereof.

FIGS. 2-4 illustrate the splicing fabric of the present invention. Essentially, the present splicing fabric is woven of a single set of warp yarns 34 intermeshed with a filling yarn 36. According to the present invention, the warp yarns 34 are of a relatively high tenacity, i.e., relatively high tensile strength for the denier of the yarn, and a relatively high modulus of elasticity, i.e., a relatively low degree of elongation or strain in relation to longitudinal load or stress thereon, and the present invention further provides that the particular weave construction of the fabric causes the warp yarns to be relatively highly crimped. In this manner, the fabric has a relatively high warpwise strength and tenacity commensurate with that of the warp yarns while at the same time the crimped nature of the warp yarns renders the fabric relatively bendable and flexible in its warpwise direction and provides the fabric with an overall relatively lower modulus of elasticity than the warp yarns themselves through an initial range of fabric elongation from a relaxed state. The overall stretchability of the fabric, however, is nevertheless limited because the relatively high modulus of elasticity of the warp yarns themselves acts to minimize further fabric elongation after the available initial range of elongation provided by the crimped configuration of the warp yarns in the relaxed fabric.

An optimal woven fabric according to the above-described basic parameters of the present invention is produced by utilizing a multi-filament aramid yarn wherein the aramid filaments have para-oriented polyamide molecules and by weaving such yarns in a one-by-one weave pattern with the filling yarns. The preferred aramid yarns for this purpose are those produced and marketed by E. I. DuPont de Nemours and Co., Wilmington, Delaware, under the trademark KEVLAR. Nevertheless, it is also contemplated that various other high tenacity, high elastic modulus yarns and other weave constructions will produce suitable splicing fabrics within the scope and substance of the present invention. For example, it is contemplated that known glass, carbon, graphite, steel, polybenzimidozole, and boron yarns, as well as other forms of aramid yarns, could be utilized in the present splicing fabric. Further, it is contemplated that other weave constructions wherein all or a predominant proportion of the warp yarns alternate over and under each succeeding pick of the filling yarn, e.g., any of various filling rib constructions, would produce a suitable fabric with a comparable degree of warp yarn crimp. Preferably, the degree of warp yarn crimp should be at least approximately 10% and optimally in the range of 10% to 20% depending upon the particular fabric construction and the denier of warp and filling yarns being employed.

Any of various known yarns may be utilized as the filling yarn, a multi-filament nylon yarn generally being preferred. The weave structure should minimize the degree of crimp in the filling yarn, preferably in the range of less than approximately 5.0%, so that the filling yarn is relatively uncrimped in the relaxed fabric.

As will be understood, the denier of the warp and filling yarns and the weave construction affects not only the strength and elastic properties of the fabric but also its dimensional thickness. As will be understood by those persons skilled in the art, woven fabrics constructed according to the present invention are of significantly greater warpwise tenacity per unit fabric thickness than the above-described conventional splicing fabrics utilizing nylon warp yarns. Accordingly, a fabric according to the present invention will be of a substantially reduced thickness in comparison to a comparable conventional nylon splicing fabric of substantially the same tenacity. Thus, splicing fabrics of the present invention will generally occupy a significantly lesser proportion of the cross-sectional thickness of the splice without sacrificing strength in comparison to the use of conventional splicing fabrics. Preferably, splicing fabrics according to the present invention therefore need occupy no more than approximately ⅛ of the cross-sectional thickness of the cover layer of the belt ends being spliced in order to achieve sufficient desirable tenacity in the fabric. For the greatest proportion of conventional conveyor belts, the warp yarns will be of a denier in the range of 1,000 to 3,000, typically between 1,500 and 2,500 denier. The filling yarn is preferably of a comparable denier, typically between 1,500 and 2,000 denier.

To further optimize the tenacity of the present fabric, the number of warp yarns per unit of weftwise dimension of the fabric is substantially maximized for the particular denier of the warp yarns being utilized while at the same time the number of filling yarns per unit of warpwise dimension of the fabric is compatibly selected to generally maximize the crimp of the warp yarn.

In order to promote the ability of the present fabric to bond to the rubber material of conventional conveyor belts when utilized in a conventional butt splice, it is additionally preferred that the fabric undergo a finishing operation wherein a suitable adhesive is applied to the woven fabric and is then heat cured onto the fabric. As a result of such finishing operation, the fabric may shrink somewhat, causing the number of warp and filling yarns per inch and the yarn crimp to be correspondingly increased. In order to maintain the filling yarns as relatively uncrimped as possible, the unfinished fabric construction is preferably selected to ave a filling yarn crimp in the range of 1.5% or less so that the filling yarn crimp in the finished fabric will be less than approximately 5.0% as preferred.

The following are examples of two particular splicing fabrics according to the preferred embodiment of the present invention. Yarn counts, crimps, fabric weight and fabric gauge are prior to any finishing operation on the fabric.

EXAMPLE 1

Warp Yarn: Dupont KEVLAR 956, 1500 denier, 1 ply, S twist, 3.0 twists per inch —0.5 TPI.
Filling Yarn: Allied Chemical Corp. nylon 1R70, 1890 denier, 1 ply, Z twist, 4.0 twists per —0.5 TPI.
Weave Pattern: 1X1 Plain Weave
Warp Yarn Count: 57.0–58.0 ends per inch
Filling Yarn Count: 18.5–19.5 picks per inch
Warp Yarn Crimp: 10.5–14.5%
Filling Yarn Crimp: 0.5–1.5%
Fabric Weight: 16.4–18.0 ounces per square yard
Fabric Gauge (thickness): 0.031–0.037 inches

EXAMPLE 2

Warp Yarn: Dupont KEVLAR 956, 2250 denier, 2 ply, S twist, 2.0 twists per inch ±0.5 TPI.
Filling Yarn: Allied Chemical Corp. nylon 1R70, 1890 denier, 1 ply, Z twist, 4.0 twists per ±0.5 TPI.
Weave Pattern: 1X1 Plain Weave
Warp Count: 37.7–38.7 ends per inch
Filling Yarn Count: 16.5–17.5 picks per inch
Warp Yarn Crimp: 10.5–18.5%
Filling Yarn Crimp: 0.5–1 5%
Fabric Weight: 28.8–30.2 ounces per square yard
Fabric Gauge (thickness): 0.047–0.056 inches As will be readily recognized, the fabric of Example 2 is approximately 50% thicker and, in turn, of substantially greater warpwise tenacity than the fabric of Example 1. Accordingly, the fabric of Example 2 is suitable for use in splicing relatively thicker conveyor belts of a higher tension rating than the fabric of Example 1. As those persons of skill in the art will readily recognize from these examples, a particular woven splicing fabric according to the present invention can be specifically designed and engineered for substantially any conveyor belt splicing use by selective variation of the denier of the warp yarns and, if and as necessary, comparable variation of the filling yarn denier, coupled with attendant appropriate variations in the warp and filling yarn counts according to the above-discussed parameters and considerations of the present invention. As will of course be understood, any fabric of the present invention when incorporated in a conveyor belt splice such as illustrated in FIG. 1, will be oriented with the warp yarns extending in substantial alignment with the longitudinal extent of the abutting belt ends whereby the warpwise strength and elongational properties attendant to the present fabric construction contribute to the strength and reliability of the splice produced.

The advantages of the fabric of the present invention may thus be understood. Essentially, the fabric construction of the present invention optimizes warpwise fabric tenacity, i.e., strength, for the gauge or thickness of the fabric, as a result of the use of high tenacity warp yarns, while at the same time the relatively high crimp of the warp yarns provides the fabric with a sufficient degree of warpwise flexibility and an initial limited degree of warpwise stretchability from a relaxed state of the fabric such that the fabric substantially strengthens a conveyor belt splice in which utilized while at the same time is sufficiently yieldable in response to stress and strain imposed on the splice at the outwardly facing cover layer of the belt to yield to deflective and elongational forces imposed on the belt during normal operation so that such forces do not tend to cause the splice to separate.

Figure 5:
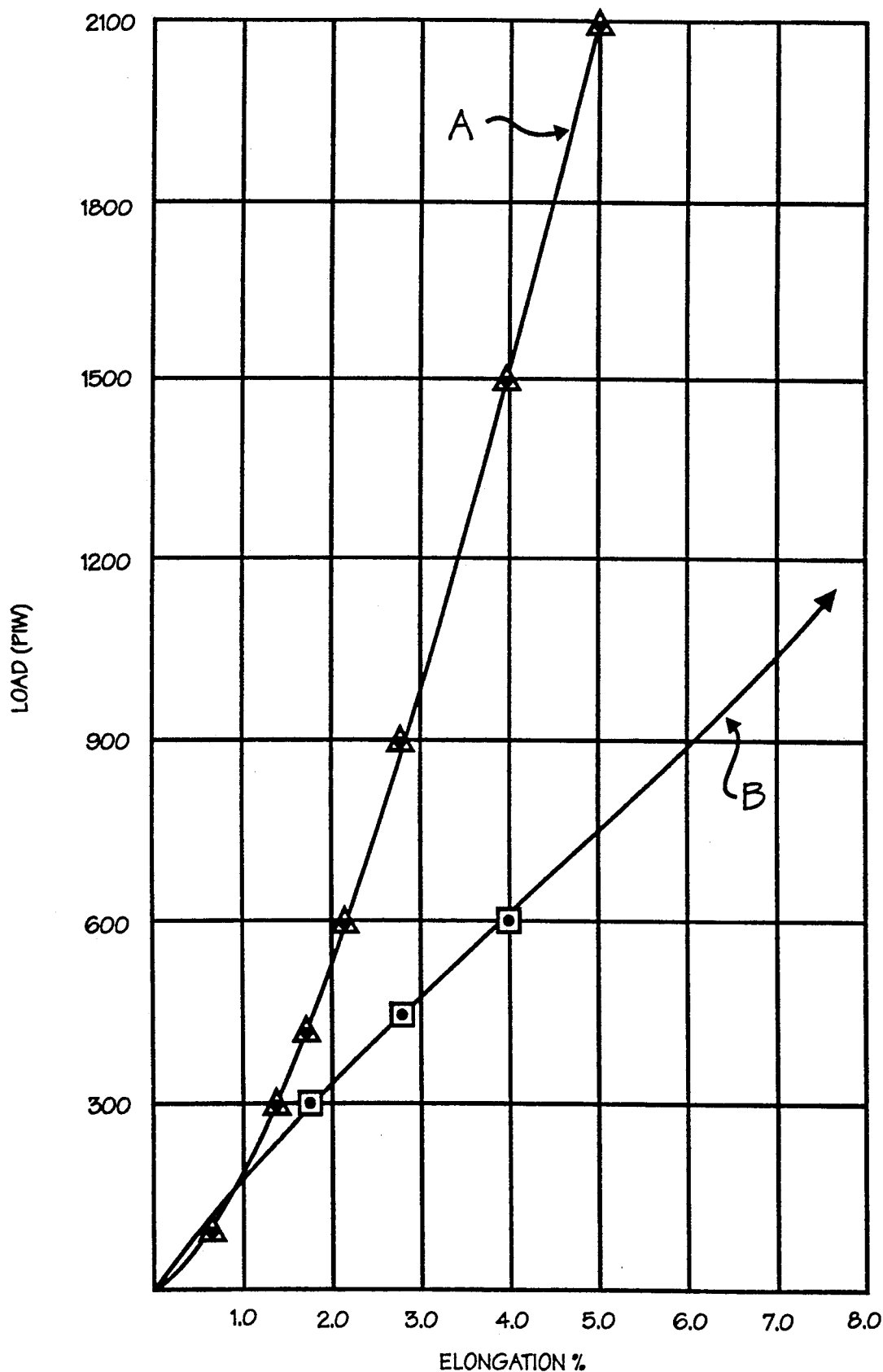
FIG. 5 is a graph comparing the stress-strain properties of the splicing fabric of the present invention with a comparable conventional splicing fabric.
Figure 6:
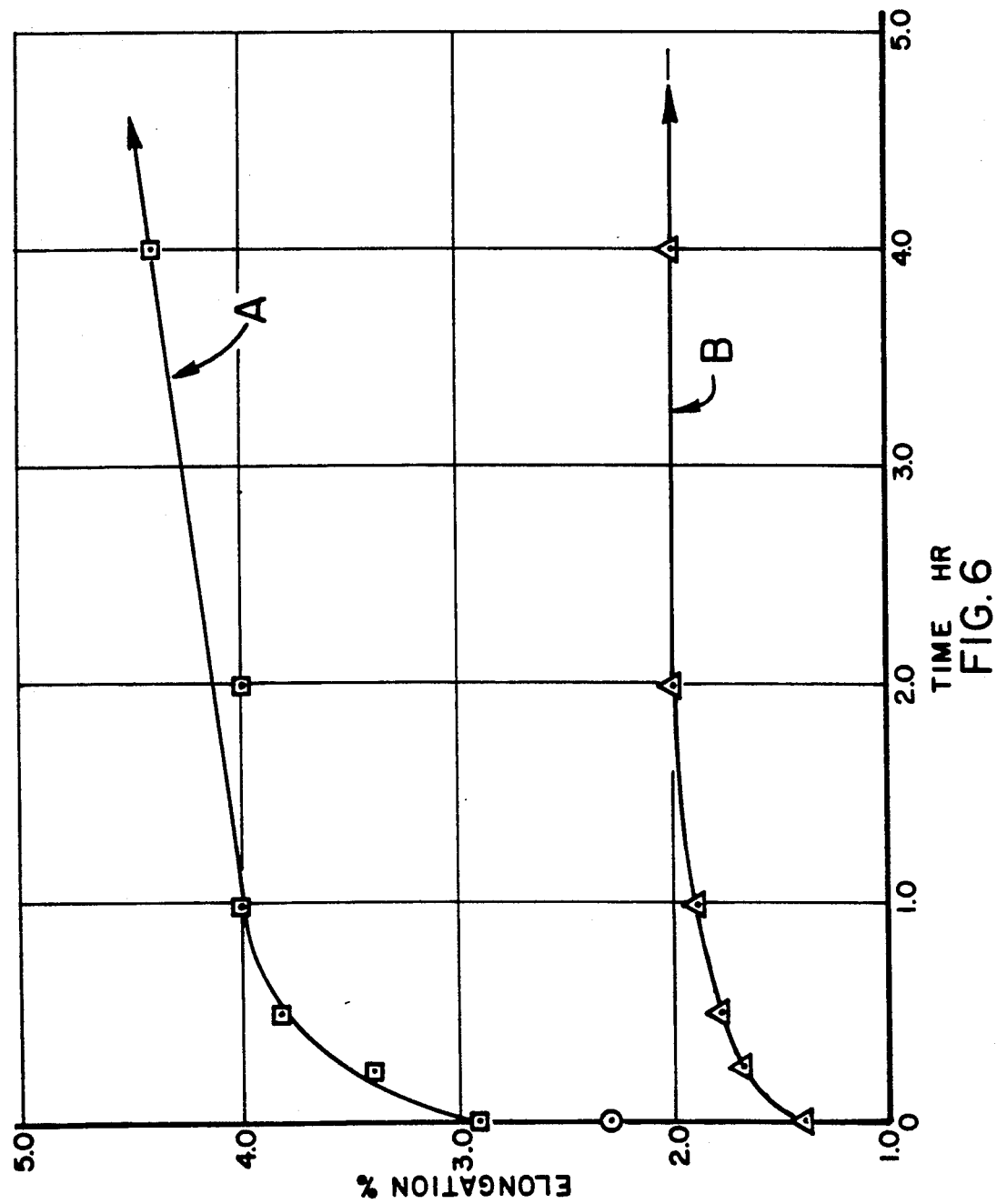
FIG. 6 is a graph comparing the dynamic creep properties of the splicing fabric of the present invention with a comparable conventional splicing fabric.

These properties of the present splicing fabric are graphically illustrated in FIGS. 5 and 6. FIG. 5 depicts comparative stress-strain curves respectively for the present splicing fabric according to the Example 1 above and a comparable conventional nylon-based splicing fabric of the type described above, each curve plotting load (stress) on the fabric in pounds per inch of fabric width against the resultant percentage elongation of the fabric. The stress-strain curve for the fabric of the present invention is indicated at A while the stress-strain curve for the conventional nylon-based fabric is indicated at B. Each fabric is basically intended for splicing use in conveyor belts of tension ratings in the range of 400-450 pounds per inch of belt width. As will be recognized from a comparison of the two curves A,B, the effective modulus of elasticity of the fabric of the present invention is lower during an initial range of loading up to about 300 pounds per inch of fabric width, but for greater loads, the modulus of elasticity of the present fabric is substantially greater than the conventional nylon-based fabric.

Similarly, FIG. 6 depicts comparative dynamic creep curves for the same two fabrics, wherein the percentage fabric elongation when subjected to a constant load is plotted against the elapsed time of loading in hours. Hereagain, the dynamic creep curve for the present fabric is indicated at A while the creep curve for the conventional nylon-based fabric is indicated at B. As will be readily recognized, the fabric of the present invention is considerably less subject to undesirable creep in the fabric's longitudinal dimension over the life of a conveyor belt splice formed with the present fabric in comparison to a splice formed with the conventional fabric.

The relatively reduced thickness of the fabric of the present invention in comparison to conventional splicing fabrics enables reliable splices to be formed therewith without producing an increased cross-sectional thickness in the belt at the location of the splice. In sum, the present fabric substantially achieves an optimal combination of strength, dimensional and elongational properties desirable in a conveyor belt splicing scab fabric.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim

1. A conveyor belt butt splice comprising two conveyor belt ends abutted end-to-end with one another, said belt ends having respective splicing recesses adjoining and opening to one another across the abutment of said belt ends, a unitary piece of woven splice fabric disposed in said adjoining recesses across the abutment of said belt ends with the warpwise extend of said splice fabric in substantial alignment with the longitudinal extent of said abutting belt ends, and means for adhesively bonding said splice fabric to each said belt end within their respective said splicing recesses, said splice fabric comprising a set of warp yarns selected from the group of yarns consisting of aramid, glass, carbon, graphite, steel, polybezimidozole, and boron fibers and having a denier of greater than 1000 thereby to provide substantially high tenacity, determined as a substantially high tensile strength of the warp yarns in relation to the denier of the warp yarns in comparison to other available yarns, and to provide substantially high modulus of elasticity, determined as a substantially low degree of elongation of said warp yarns in relation to longitudinal load thereon in comparison to other available yarns, said warp yarns being intermeshed with filling yarn of a denier of greater than 1000 in a weave construction wherein said warp yarns are crimped at least approximately 10% and said filling yarn is crimped less than approximately 5% thereby to render said fabric bendable in its warpwise direction in substantial correspondence to the bendability of said conveyor belt ends and to provide said fabric with a first modulus of elasticity determined in response to warpwise elongational forces in an initial range of fabric elongation from a relaxed state, said first modulus of elasticity being relatively lower than the modulus of elasticity of said warp yarns alone to provide said fabric with a controlled degree of stretchability during said initial range of fabric elongation, and a second modulus of elasticity determined in response to warpwise elongation forces in a succeeding range of fabric elongation following said initial range of fabric elongation, said second modulus of elasticity being commensurate with the modulus of elasticity of said warp yarns.

2. A conveyor belt splice according to claim 1 and characterized further in that said warp yarns are comprised of aramid fibers.

3. A conveyor belt splice according to claim 2 and characterized further in that said aramid fibers have para-oriented polyamide molecules.

4. A conveyor belt splice according to claim 3 and characterized further in that each said warp yarn consists essentially of multiple continuous aramid filaments.

5. A conveyor belt splice according to claim 1 or 4 and characterized further in that each said filling yarn consists essentially of multiple continuous nylon filaments.

6. A conveyor belt splice according to claim 1 and characterized further in that said weave construction is a one-by-one weave of said warp and filling yarns.

7. A conveyor belt splice according to claim 1 and characterized further by a finish on said fabric for promoting bonding of said fabric between said two conveyor belt ends.

8. A conveyor belt splice according to claim 7 characterized further in that said finish is an adhesive.

9. A conveyor belt butt splice according to claim 1 and characterized further in that said splicing recesses are formed in an outward side of each said belt end which are to face away from a belt support means during belt operation.

* * * * *

UNITED STATES PATENT AND TRADEMARK OFFICE
CERTIFICATE OF CORRECTION

PATENT NO. : 5,275,858
DATED : January 4, 1994
INVENTOR(S) : Michael J. Hock

It is certified that error appears in the above-identified patent and that said Letters Patent is hereby corrected as shown below:

Column 5, lines 17-18, delete paragraph break.

Column 5, line 67, delete "ave" and insert therefor -- have --.

Column 6, line 11, delete "-0.5 TPI" and insert therefor -- +/- 0.5 TPI --.

Column 6, line 13, delete "-0.5 TPI" and insert therefor -- +/- 0.5 TPI --.

Column 6, line 31, delete "1 5%" and insert therefor -- 1.5% --.

Column 6, lines 64-65, delete paragraph break.

Column 8, line 8, delete "extend" and insert therefor -- extent --.

Signed and Sealed this

Second Day of August, 1994

Attest:

BRUCE LEHMAN

Attesting Officer    Commissioner of Patents and Trademarks